Aug. 1, 1933.  A. G. F. WALLGREN ET AL  1,920,724
BEARING
Filed Oct. 29, 1931  2 Sheets-Sheet 1
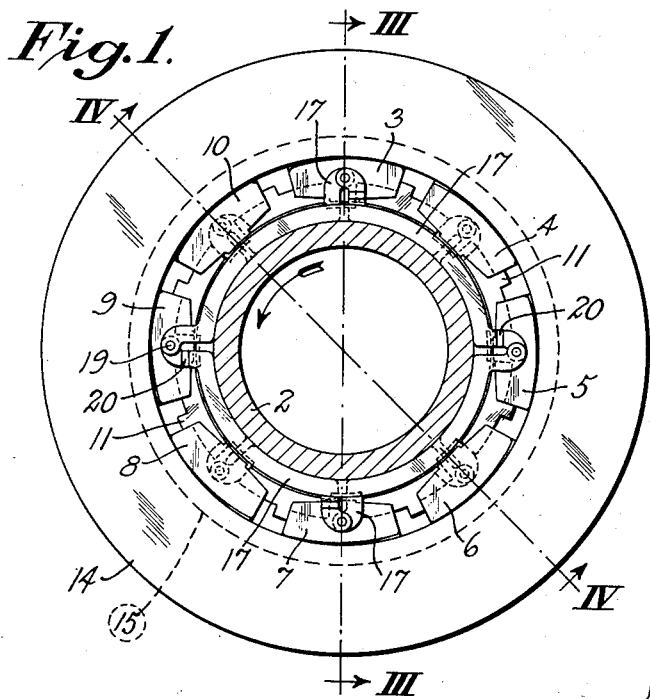
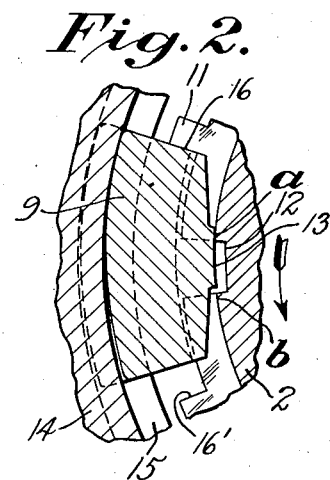
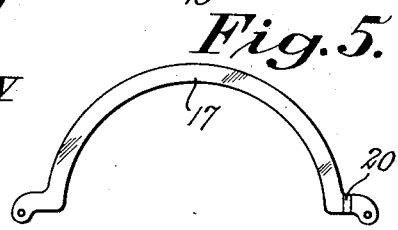
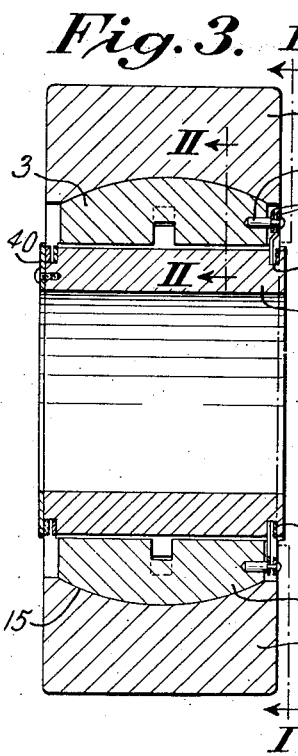
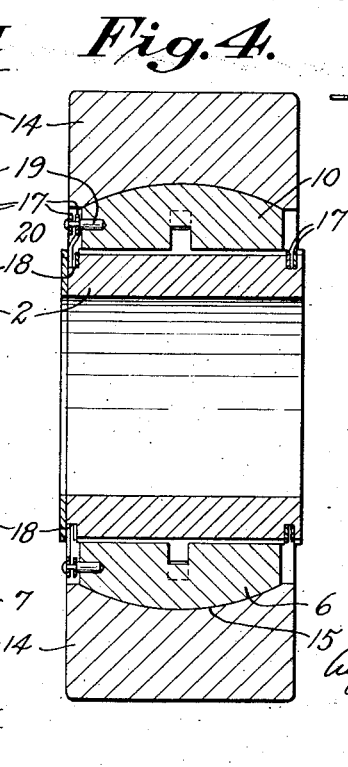
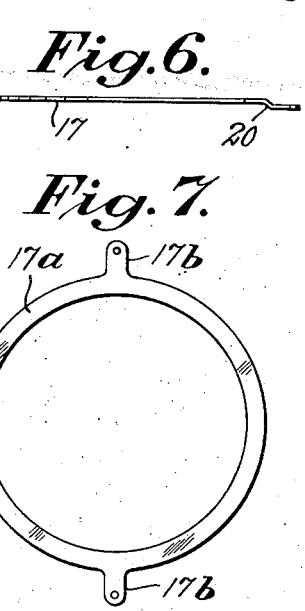

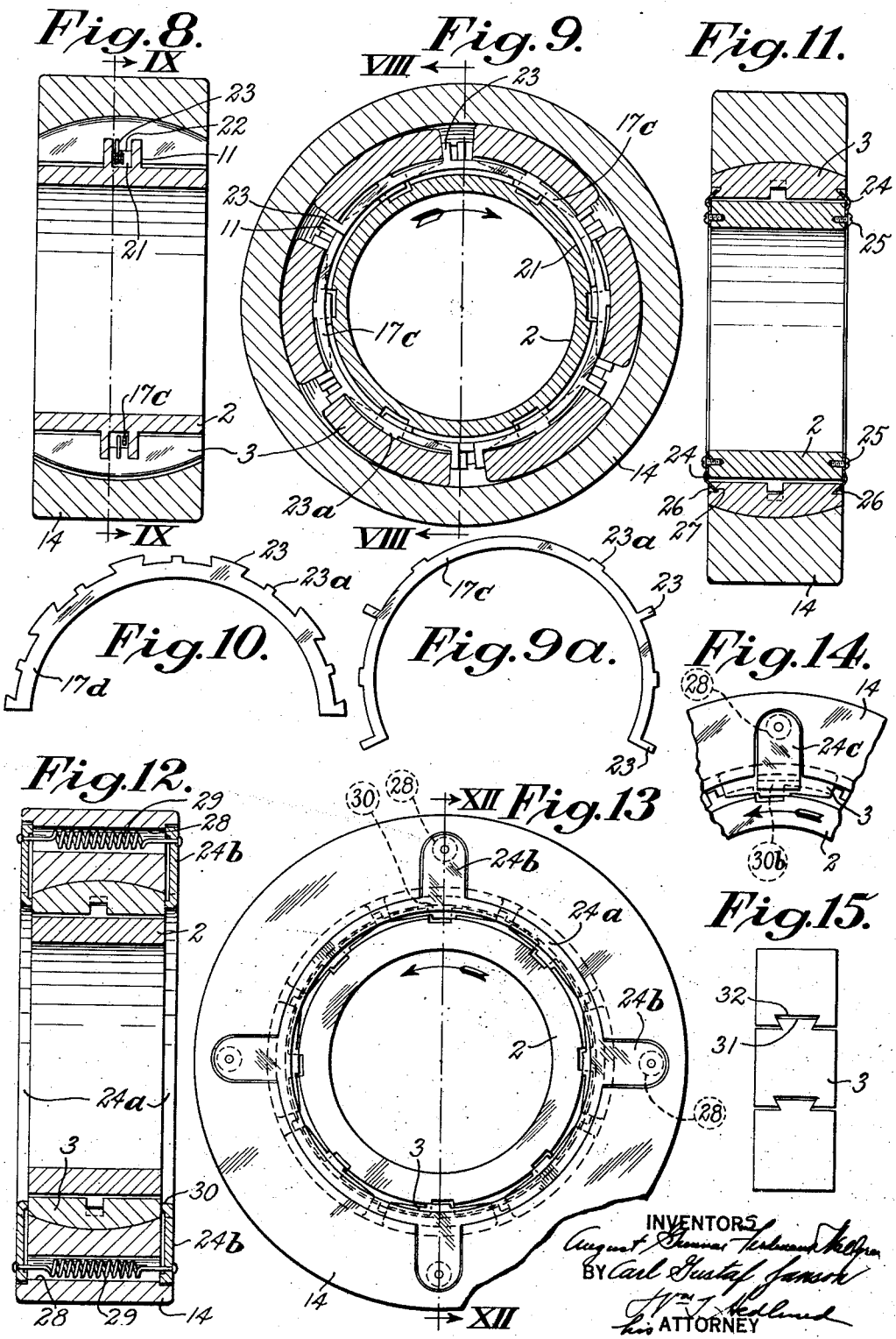

Patented Aug. 1, 1933

1,920,724

UNITED STATES PATENT OFFICE 1,920,724

BEARING

August Gunnar Ferdinand Wallgren and Carl Gustaf Janson, Stockholm, Sweden, assignors to Aktiebolaget Nomy, Stockholm, Sweden, a Corporation of Sweden Application October 29, 1931, Serial No. 571,875, and in Sweden November 4, 1930

28 Claims. (Cl. 308—73)

The present invention relates to bearings and more particularly to bearings comprising a plurality of blocks which travel between inner and outer rings and which are carried along by one of the rings and which are tilted to form wedge-shaped oil films. In the preferred form of this type of bearing there are abutment projections on one of the rings against which the blocks abut. Furthermore, such bearings are preferably made so as to be capable of rotation in both directions, and the blocks have limited peripheral movement with respect to the ring which carries them along in rotation.

The purpose of the present invention is to assure correct positions of the blocks in all their respective peripheral positions and independently of peripheral speed, so that the blocks are kept in contact with the proper abutment surfaces although their weight or other factors may tend to move them away.

The invention will be described in detail with reference to the accompanying drawings forming a part of this specification and of which:

Fig. 1 is an end view, that is, looking axially, of a bearing embodying the invention and of the type permitting rotation in both directions, the view being partly in section on the line I—I of Fig. 3;

Fig. 2 is a partial sectional view taken on the line II—II of Fig. 3;

Fig. 3 is an axial sectional view taken on the line III—III of Fig. 1;

Fig. 4 is an axial view taken on the line IV—IV of Fig. 1;

Figs. 5 and 6 are two views of a retaining element in accordance with the invention;

Fig. 7 shows a modified form of retaining element;

Fig. 8 is an axial section taken on the line VIII—VIII of Fig. 9 and shows another form of bearing embodying the invention;

Fig. 9 is a transverse sectional view taken on the line IX—IX of Fig. 8;

Fig. 9a shows a retaining member forming part of the bearing shown in Figs. 8 and 9;

Fig. 10 shows a modified form of retaining element;

Fig. 11 is an axial sectional view of still another form of the invention;

Fig. 12 is a similar view of a still further form of the invention and is taken on the line XII—XII of Fig. 13;

Fig. 13 is an end view of the bearing shown in Fig. 12;

Fig. 14 shows a modified retaining arrangement; and

Fig. 15 shows how certain of the blocks may be tied together to form the retaining means.

The bearing shown in Figs. 1 to 6, inclusive, includes eight blocks which are designated by the reference characters 3 through 10, respectively. These blocks are positioned radially between an inner or carrier ring 2 and an outer or race ring 14. The ring 2 is secured to the shaft which is journalled in the bearing in any suitable manner. On the ring 2 there are projections 11 providing abutment surfaces 16 and 16'. (See Fig. 2.) Abutment surfaces 16 and 16' of adjacent projections are further apart peripherally than the end or other surfaces of the intermediate block which contact the respective abutment surfaces. Thus, each block has limited peripheral movement with respect to the ring 2. The ring 2 is provided with axial grooves 12. The surfaces $a$ and $b$ at the edges of these grooves 12 are bearing surfaces or shoulders against which the blocks rest and bear alternatively, depending upon the direction of rotation. If, for example, the direction of rotation is as indicated by the arrow in Fig. 2, the end of block 9 contacts the rearmost abutment surface 16, with respect to the direction of rotation, and the projection 13 at the center of the block has its rear part in contact with the bearing surface or shoulder $a$ while the forward part of this surface extends slightly into the groove 12, thus providing the tilting effect.

The outer ring 14, which is usually stationary, has a spherical bearing surface and the outer surfaces of the block are spherical to conform to the spherical surface of the part 14.

Referring again to Fig. 2, if the direction of rotation is reversed, the ring 2 moves clockwise, as shown, relative to block 9 for a small distance so that the block contacts the abutment surface 16' and the surface 13 rides up on shoulder $b$. Thus, in both directions of rotation, the blocks are supported on surfaces or lines behind the center of gravity of the block with reference to the direction of rotation. Thus, the function of the bearing to provide wedge-shaped films is obtained in either of the directions of rotation. It is important that the blocks have their proper positions even in the case of a uni-directional bearing in order to avoid disadvantageous results of improper assembly and for other reasons.

So far as, in detail, described, this bearing is of the type disclosed in the application of August Gunnar Ferdinand Wallgren, Serial No. 277,769, filed May 14, 1928, Pat. No. 1,871,485, granted August 16, 1932.

In bearings of the above described kind, it may happen under certain conditions, for example, at very low speeds just after starting or just before stopping, that a block, as for instance, in the position of the block 9 in Fig. 1, will have a tendency to move out of its correct operative position due to its own weight. It will be appreciated that the blocks which are entirely below the horizontal center line in Fig. 1 are, so to speak, loaded. That is, the weight of the shaft bears down on these blocks. However, the blocks which are at and above the horizontal center line may be said to be unloaded. Now, it has been noted that there is sufficient play when the blocks are unloaded to permit peripheral shifting of the blocks. Considering the block 9 in Fig. 1, this block should remain in the position shown in Fig. 2 so that the back edge of the surface 13 is in contact with or alongside surface a. The block 9, however, has a tendency to move downwards due to its own weight. This is counteracted by the friction due to contact with adjacent part or parts which tends to keep the block up. However, if the downward force effect of the weight is greater than the upward force effect of friction, the block 9 will fall down until it contacts the abutment surface 16' (Fig. 2). Should this happen, the block, when entering the zone of load, will be in the incorrect position because the forward end of the surface 13 will then be in contact with the shoulder b, whereas the forward end of surface 13 should project slightly into groove 12. This will result in improper action of the bearing since the block is not tilted or tilted the wrong way and a wedge-shaped film cannot be formed.

This disadvantage is entirely eliminated by the present invention, in accordance with which, structure is provided for preventing such shifting of the blocks when in an unloaded position. One embodiment of the invention is shown in Figs. 1 to 6, and comprises what may be termed retaining elements 17. There are a number of retaining elements 17. Each block is connected by two retaining elements 17 with the diametrically opposite block. Thus, there being eight blocks in the bearing shown in Fig. 1, there are eight retaining elements 17.

Each retaining element 17 comprises a semi-circular band at the diametrically opposite ends of which are projections having holes therein adapted to receive pins 19 which enter holes in the respective blocks. The ring elements are offset as indicated at 20 so as to permit the projections of two cooperating retaining elements to be mounted on a single pin 19.

Considering Fig. 1, the blocks 5 and 9 are connected by two retaining elements 17. The elements 17 rest in grooves 18 formed in the ring 2. The blocks are axially shorter than the ring 2 and the outer member 14 as shown in Fig. 3 in order that the retaining elements may be within the general outline of the bearing for protection. The retaining elements for one-half the total number of blocks are arranged at one end of the bearing and the remaining retaining elements are on the other end. As will be obvious from the above and from the drawings, the retaining elements are all alike and the bearing is symmetrical so that the various parts have a maximum of similarity which is of advantage in manufacture and so that there is a balance of weight. Centrifugal forces are compensated for by the balancing of the construction.

Consider the position in Fig. 1 and Fig. 2. As above described, there is a tendency for the block 9 to drop relative to the ring 2 due to its own weight. With the retaining elements 17 connecting this block over the top of the ring 2 with the block 5, such dropping of the block 9 is impossible. The blocks being similar and of equal weight, the weight of block 5 counter-balances the weight of block 9. The weights of each of these blocks act downwardly. In addition, there is the force of friction which acts downwardly on block 5 and upwardly on block 9; that is, opposite to the direction of rotation. Thus, there is only the weight of block 9 tending to move this block downwards faster than the speed of rotation, while there are three forces opposing this; namely, the weight of block 5, the friction between block 5 and the adjacent surface or surfaces, and the corresponding friction with respect to block 9. The weights being equal, it is consequently impossible for the block 9 to drop ahead of its proper place in rotation. By the time the block 5 has reached the point when its weight tends to cause it to drop, the block 9 has entered the zone of load and the block 9 then becomes the block which holds the block 5 in its proper position. It will be seen that the two cooperating retaining elements act alternatively to hold up the block which has a tendency to drop. It will be understood that the same action takes place with respect to the other blocks and that therefore it is impossible for a block to move out of its proper position. At the same time, it is possible for the bearing to be reversed since inter-connected blocks are simultaneously in a zone of diminished load where they can shift; namely, in the position of the blocks 5 and 9 in Fig. 1.

Fig. 7 shows a modified retaining element 17a which is, in effect, a uniting of two of the cooperating retaining elements 17 of Figs. 5 and 6. Each retaining element 17a is a complete circular ring with diametrically opposed projections 17b having holes for reception of the pins 19. It will be understood that the grooves 18 will not receive a construction such as shown in Fig. 7, if they are merely cut inwardly in the ring 2, but will receive a construction as shown in Figs. 5 and 6. If the construction shown in Fig. 7 is used, the outer flange formed by the groove 18 must be omitted or some other provision must be made so that the ring 17a can fit into its proper place. If desired, this flange may be made separate, as indicated at 40 in Fig. 3. It will be evident that instead of arranging the retaining elements 17 and 17a in a groove or otherwise in ring 2, it would be possible to arrange the retaining elements in the stationary member 14. However, it is obviously preferable that there be as little friction as possible between the retaining elements 17 and the member in which they are carried, and therefore it is preferable to mount them on the ring 2 since the blocks travel with the ring 2.

In the embodiment shown in Figs. 8, 9 and 9a, the retaining elements 17 are set in peripherally extending grooves cut centrally in the projections 11 of the ring 2. Corresponding grooves 22 are cut in the middle parts of the blocks. This bearing comprises six blocks and the retaining elements, as in the previously described embodiment, connect two diametrically opposite blocks. The construction of the retaining elements, here marked 17c, is shown in Fig. 9a. They are provided with projections 23 which are immediately adjacent the ends of the blocks so that there is but little peripheral movement of the blocks relative to the cooperating retaining elements. However, there should be sufficient play between these parts so that the blocks can tilt to their proper operative positions. The retaining elements extend around substantially one-half of the periphery of the bearing and are made of flat form so that they can all set into the grooves 21 and have space between them axially so that they can be inserted by slightly bending them. The functioning of this embodiment is the same as that previously described.

The retaining elements 17c are provided with projections or heels 23a which prevent outward movement against the blocks when the retaining elements are in the lower part of the bearing. Each heel 23a is arranged at the middle portion of a block so that they do not appreciably affect the tilting of the blocks. It will be understood that in order to eliminate any effect of centrifugal force, the rings can be carried all the way around the bearing. In such case, it will be clear, however, that the construction must be modified by providing joints in them or otherwise constructing them or the ring 2 so that they can be fitted to the bearing. It will also be obvious that it is not necessary for the grooves 21 to be centrally located with respect to the bearing. There may be two sets of retaining elements in two grooves symmetrically laterally disposed. Also, it is not necessary that blocks be connected which are diametrically opposite each other. It would be possible to connect blocks which are more than 180° apart or even less. It is possible to connect all the blocks which are in the unloaded zone of the bearing. Care should be taken that so many blocks are not connected as to prevent proper reversing of the bearing.

Fig. 10 shows a modified form of a retaining element operating on the same principle as that shown in Fig. 9a for a bearing with ten blocks. As is clear from this figure, a ring element of this type connects one-half of the total number of the blocks. This is possible without disadvantageously affecting reversal of the bearing for reasons explained above.

The same result, namely, the prevention of the dropping or shifting of the blocks out of their proper operative positions, obtained in the above described forms by connecting several blocks together, can also be obtained by providing friction or other force means which acts, additionally to the friction force above mentioned, against the tendency of the blocks to drop.

In Fig. 11 is shown a bearing comprising springs 24 which are connected to the ring 2 by means of screws 25. The projecting resilient portions 26 of these springs are bent inward and bear against the blocks in recesses cut out of the same or otherwise formed therein. The springs 24 extend around the whole periphery. It is possible, however, that two springs may be used for each block which are shorter than the peripheral lengths of the blocks and centrally disposed with respect thereto. The stress in the retaining springs 24 is such that the friction force which is generated as a result thereof is greater than the difference between the weight of the block tending to move it downwardly and the oppositely directing friction force acting in the opposite direction, as above described, but not so great that the reversal of the blocks is prevented.

In the bearing shown in Figs. 12 and 13 the friction elements acting on the blocks are arranged on the stationary part of the bearing 14. Two rings 24a are provided at opposite ends of the bearing, which rings have projections 24b which are connected by means of tension springs 29 arranged in holes 28. On account of the stress in the springs 29, the rings 24a and the inwardly projecting flange 30 thereof are stressed against the side edges of the blocks as a result of which the friction forces are generated, which prevent the improper displacement of the blocks.

It is conceivable that friction members which are stationary as in Fig. 12 need be present only where there is a tendency for a block to fall. However, this would require mounting the bearing in a given position. In order to permit the bearing to be mounted in any manner, it is preferable that the friction rings extend around the whole bearing.

In Fig. 14 is shown a construction wherein a number of flat springs 24c are connected to the stationary ring 14 and bear against the blocks. Care should be taken in such an arrangement that the springs are so wide that they will not slip in between blocks.

In Fig. 15, dovetailed connections 31 and 32 are shown between certain of the blocks in order to tie the blocks together. The connection must be such that each block has ample movement with respect to any adjacent blocks to permit it to tilt. In such an arrangement, it is preferable that not more than one-half the blocks be tied together.

It will be understood that the invention is not limited to the form described above, but may be embodied by even further structural forms.

What we claim is:

1. A bearing comprising relatively rotatable members, a plurality of blocks having operative positions between said members and carried along with one of said members during rotation, means permitting limited movement between said blocks and said one of said members, and additional means for preventing such limited movement during a period of rotation in a given direction.

2. A bearing comprising relatively rotatable members, a plurality of blocks having operative positions between said members and carried along with one of said members during rotation, means permitting limited movement between said blocks and said one of said members, and additional means for confining such limited movement to times of reversal of direction of rotation.

3. A radial bearing comprising inner and outer members and a plurality of blocks having operative positions radially between said members, said blocks and said inner member having cooperating surfaces for tilting the blocks and for carrying the blocks in rotation with the inner member while permitting limited movement of the blocks relative to the inner member, each of said blocks being influenced in certain one or more positions to move from operative position due to its weight, and means separate from said inner member for preventing such last mentioned movement.

4. A radial bearing comprising inner and outer members and a plurality of blocks having operative positions radially between said members, said blocks and said inner member having cooperating surfaces for tilting the blocks and for carrying the blocks in rotation with the inner member while permitting limited movement of the blocks relative to the inner member, each of said blocks being influenced in certain one or more positions to move from operative position due to its weight, and means connecting any one of said blocks with another of said blocks to prevent such last mentioned movement.

5. A radial bearing comprising inner and outer members and a plurality of blocks having operative positions radially between said members, said blocks and said inner member having cooperating surfaces for tilting the blocks and for carrying the blocks in rotation with the inner member while permitting limited movement of the blocks relative to the inner member, one of said blocks being influenced in certain one or more positions to move from operative position due to its weight, and a connection between said one block and another block whereby the weight of one block counter-balances the weight of the other.

6. A radial bearing comprising inner and outer members and a plurality of blocks having operative positions radially between said members, said blocks and said inner member having cooperating surfaces for tilting the blocks and for carrying the blocks in rotation with the inner member while permitting limited movement of the blocks relative to the inner member, each of said blocks being influenced in certain one or more positions to move from operative position due to its weight, and retaining elements connecting oppositely disposed blocks.

7. A radial bearing comprising inner and outer members and a plurality of blocks having operative positions radially between said members, said blocks and said inner member having cooperating surfaces for tilting the blocks and for carrying the blocks in rotation with the inner member while permitting limited movement of the blocks relative to the inner member, each of said blocks being influenced in certain one or more positions to move from operative position due to its weight, and retaining elements for limiting movement of the blocks with respect to other blocks.

8. A radial bearing comprising inner and outer members and a plurality of blocks having operative positions radially between said members, said blocks and said inner member having cooperating irregular surfaces for tilting the blocks and for carrying the blocks in rotation with the inner member while permitting limited movement of the blocks relative to the inner member, each of said blocks being influenced in certain one or more positions to move from operative position due to its weight, and resilient means for preventing such last mentioned movement.

9. A radial bearing comprising inner and outer members and a plurality of blocks having operative positions radially between said members, said blocks and said inner member having cooperating irregular surfaces for tilting the blocks and for carrying the blocks in rotation with the inner member while permitting limited movement of the blocks relative to the inner member, each of said blocks being influenced in certain one or more positions to move from operative position due to its weight, and spring members mounted in the inner member for preventing such last mentioned movement.

10. A radial bearing comprising inner and outer members and a plurality of blocks having operative positions radially between said members, said blocks and said inner member having cooperating irregular surfaces for tilting the blocks and for carrying the blocks in rotation with the inner member while permitting limited movement of the blocks relative to the inner member, each of said blocks being influenced in certain one or more positions to move from operative position due to its weight, and spring members mounted in the outer member for preventing such last mentioned movement.

11. In a bearing comprising a race member, a carrier member, and a plurality of bearing blocks having operative positions between said members, said blocks and carrier member having cooperating irregular surfaces for tilting the blocks and permitting and limiting relative movement of the blocks and the carrier member, said race member and blocks having cooperating sliding surfaces, the provision of a retaining element connecting two remote blocks and free with respect to an intermediate block.

12. In a bearing comprising a race member, a carrier member, and a plurality of bearing blocks having operative positions between said members, said blocks and carrier member having cooperating irregular surfaces for tilting the blocks and permitting and limiting relative movement of the blocks and the carrier member, said race member and blocks having cooperating sliding surfaces, the provision of a plurality of retaining elements connecting diametrically opposite blocks and free with respect to intermediate blocks.

13. In a bearing comprising a race member, a carrier member, and a plurality of bearing blocks having operative positions between said members, said blocks and carrier member having cooperating irregular surfaces for tilting the blocks and permitting and limiting relative movement of the blocks and the carrier member, said race member and blocks having cooperating sliding surfaces, the provision of a flat band connecting two remote blocks and free with respect to an intermediate block.

14. In a bearing comprising a race member, a carrier member, and a plurality of bearing blocks having operative positions between said members, said blocks and carrier member having cooperating irregular surfaces for tilting the blocks and permitting and limiting relative movement of the blocks and the carrier member, said race member and blocks having cooperating sliding surfaces, the provision of a plurality of flat bands connecting diametrically opposite blocks and free with respect to intermediate blocks.

15. In a bearing comprising a race member, a carrier member, and a plurality of bearing blocks having operative positions between said members, said blocks and carrier member having cooperating irregular surfaces for tilting the blocks and permitting and limiting relative movement of the blocks and the carrier member, said race member and blocks having cooperating sliding surfaces, the provision of a retaining element having projections adapted to engage remote blocks and free with respect to an intermediate block.

16. In a bearing comprising a race member, a carrier member, and a plurality of bearing blocks having operative positions between said members, said blocks and carrier member having cooperating irregular surfaces for tilting the blocks and permitting and limiting relative movement of the blocks and the carrier member, said race member and blocks having cooperating sliding surfaces, the provision of a plurality of flat bands having projections adapted to engage diametrically opposite blocks and free with respect to intermediate blocks.

17. In a bearing comprising a race member, a carrier member, and a plurality of bearing blocks having operative positions between said members, said blocks and carrier member having cooperating irregular surfaces for tilting the blocks and permitting and limiting relative movement of the blocks and the carrier member, said race member and blocks having cooperating sliding surfaces, the provision of a flat ring having projections adapted to engage diametrically opposite blocks.

18. In a bearing comprising a race member, a carrier member, and a plurality of bearing blocks having operative positions between said members, said blocks and carrier member having cooperating irregular surfaces for tilting the blocks and permitting and limiting relative movement of the blocks and the carrier member, said race member and blocks having cooperating sliding surfaces, the provision of grooves in the blocks and retaining members in said grooves connecting remote blocks.

19. In a bearing comprising a race member, a carrier member, and a plurality of bearing blocks having operative positions between said members, said blocks and carrier member having cooperating irregular surfaces for tilting the blocks and permitting and limiting relative movement of the blocks and the carrier member, said race member and blocks having cooperating sliding surfaces, the provision of a groove in the carrier member and retaining members in said grooves connecting remote blocks.

20. In a bearing comprising a race member, a carrier member, and a plurality of bearing blocks having operative positions between said members, said blocks and carrier member having cooperating irregular surfaces for tilting the blocks and permitting and limiting relative movement of the blocks and the carrier member, said race member and blocks having cooperating sliding surfaces, the provision of grooves in the blocks and relatively stiff bands in said grooves connecting diametrically opposed blocks.

21. In a rotary bearing of the type having a plurality of tiltable bearing blocks, the combination with a member having projections providing a limited range of movement of each block in direction of rotation, of additional means for restraining block movement within said range in said direction.

22. In a rotary bearing of the type having a plurality of tiltable bearing blocks, the combination with a member having projections providing abutments for the blocks and providing a limited range of movement of each block in direction of rotation, of additional means for restraining block movement within said range in said direction comprising a retaining element simultaneously engaging two remote blocks.

23. In a bearing of the type having a plurality of tiltable bearing blocks, the combination with a member having projections providing abutments for the blocks and providing a limited range of movement of each block, of additional means for restraining block movement within said range comprising a relatively stiff band connecting a block with another block remote by at least one block.

24. In a bearing of the type having a plurality of tiltable bearing blocks, the combination with a member having projections providing abutments for the blocks and providing a limited range of movement of each block, of additional means for restraining block movement within said range comprising a relatively stiff band having projections engaging two blocks removed from each other by at least one block.

25. In a bearing comprising an outer race member, an inner member, and a row of blocks having operative positions between said members, said inner member having grooves providing bearing shoulders and said blocks having irregular surfaces providing bearing surfaces adapted to slide on and off said shoulders, the combination with projections on said inner member for permitting and limiting peripheral movement of each block, of additional members for preventing the blocks from moving out of operative position comprising peripherally extending strips connecting non-adjacent blocks.

26. In a bearing comprising an outer race member, an inner member, and a row of blocks having operative positions between said members, said inner member having grooves providing bearing shoulders and said blocks having irregular surfaces providing bearing surfaces adapted to slide on and off said shoulders, the combination with projections on said inner member for permitting and limiting peripheral movement of each block, of additional members for preventing the blocks from moving out of operative position comprising peripherally extending members disposed internally of the bearing and engaging non-adjacent blocks.

27. In a bearing comprising an outer race member, an inner member, and a row of blocks having operative positions between said members, said inner member having grooves providing bearing shoulders and said blocks having irregular surfaces providing bearing surfaces adapted to slide on and off said shoulders, the combination with projections on said inner member for permitting and limiting peripheral movement of each block, of additional members for preventing the blocks from moving out of operative position comprising peripherally extending rings engaging diametrically opposite blocks.

28. In a bearing comprising an outer race member, an inner member, and a row of blocks having operative positions between said members, said inner member having grooves providing bearing shoulders and said blocks having irregular surfaces providing bearing surfaces adapted to slide on and off said shoulders, the combination with projections on said inner member for permitting and limiting peripheral movement of each block, of additional members for preventing the blocks from moving out of operative position comprising peripherally extending rings disposed internally of the bearing and having projections engaging diametrically opposite blocks.

AUGUST GUNNAR FERDINAND WALLGREN.
CARL GUSTAF JANSON.